United States Patent [19]

Earley

[11] Patent Number: 4,793,374

[45] Date of Patent: Dec. 27, 1988

[54] CORROSION RESISTANT TIRE VALVE ASSEMBLY AND COMPONENTS THEREOF

[75] Inventor: John R. Earley, Lynchburg, Va.

[73] Assignee: Bridge Products, Inc., Northbrook, Ill.

[21] Appl. No.: 38,868

[22] Filed: Apr. 15, 1987

[51] Int. Cl.$^4$ ............................................. F16K 15/20
[52] U.S. Cl. ................................................. 137/234.5
[58] Field of Search .................. 137/234.5, 223, 454.5, 137/283

[56] References Cited

U.S. PATENT DOCUMENTS

| | | | |
|---|---|---|---|
| 2,126,770 | 8/1938 | Hammond | 137/223 X |
| 2,188,713 | 1/1940 | Gora | 137/223 |
| 2,194,895 | 3/1940 | Gora | 137/223 |
| 2,311,748 | 2/1943 | Gora | 137/223 |
| 3,635,275 | 1/1972 | Davis | 152/429 |
| 3,967,639 | 7/1976 | Mottram | 137/234.5 |

FOREIGN PATENT DOCUMENTS 1067114 6/1954 France ................ 137/234.5

Primary Examiner—Stephen Hepperle
Attorney, Agent, or Firm—Willian Brinks Olds Hofer Gilson & Lione Ltd.

[57] ABSTRACT

A corrosion resistant tire valve assembly includes a valve body which is bonded at one end to an elastomeric base member that defines an outer sealing surface. A valve core assembly is threadedly mounted in the valve body, and this valve core assembly carries a seal member which is shaped to engage and seal against the outer sealing surface of the base member. In addition, the seal member extends up into an inner passageway defined by the valve core assembly. The cooperation between the seal member and the base member protects both the valve body and the valve core assembly from corrosion, as for example corrosion resulting from exposure to salt solutions commonly used to weight tires in agricultural and heavy construction applications.

11 Claims, 2 Drawing Sheets

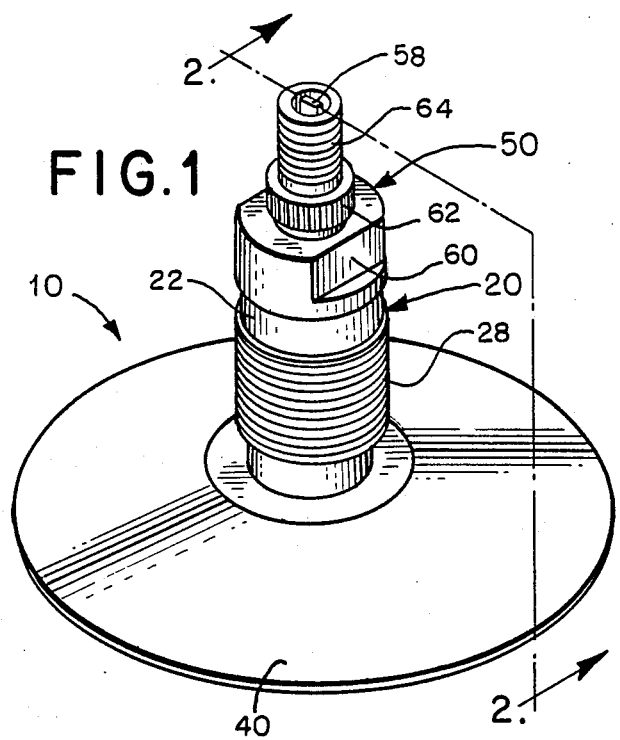
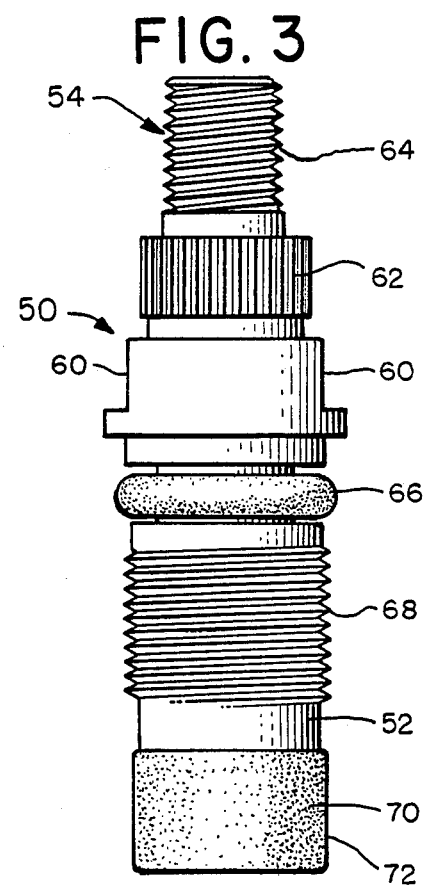
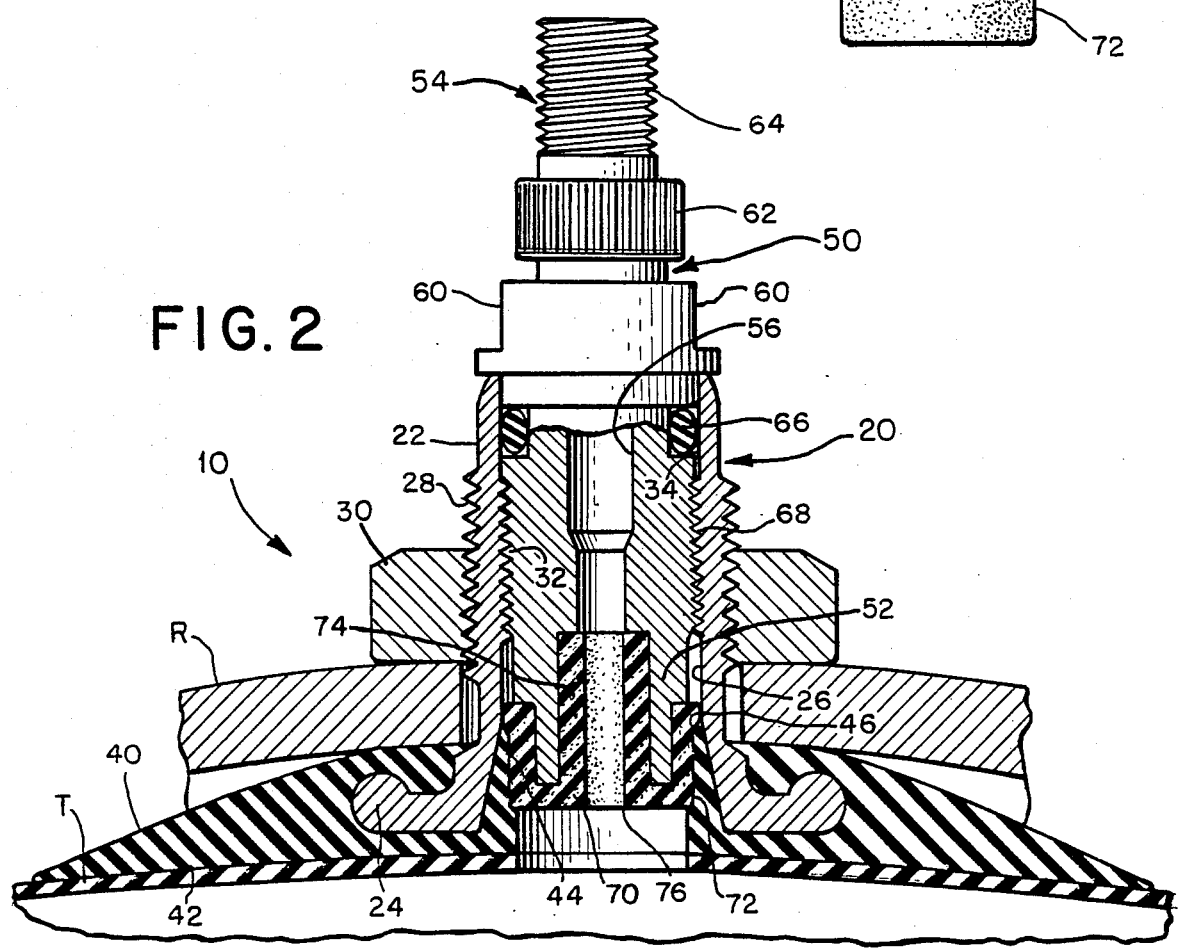

CORROSION RESISTANT TIRE VALVE ASSEMBLY AND COMPONENTS THEREOF

BACKGROUND OF THE INVENTION

This invention relates to an improved tire valve assembly which provides improved corrosion resistance both to the valve body and to the valve core assembly. The advantages of this invention are particularly important when the valve is used with a tire that is weighted with water containing a dissolved salt.

It is common practice to weight the tires of many agricultural and heavy construction vehicles by partially filling the tire with water. In order to lower the freezing point of the water, salts such as sodium chloride or calcium chloride are typically dissolved in the water.

Tire valves used in such applications must meet a number of demanding requirements. In particular, such valves are subject to the highly corrosive environment of a salt solution. In addition, when water is being introduced into the tire it is important that the valve provide a high volume, low resistance path.

In the past, a number of different approaches have been used in an attempt to minimize corrosion of such valves. Stasiunas U.S. Pat. No. 4,404,985, assigned to the assignee of the present invention, discloses an air-liquid valve for off-the-road vehicle tires which embeds the lower end of the valve body in an elastomeric base member. Though the Stasiunas valve provides important improvements over conventional valves, it still allows salt solutions to come into contact with the zone of bonding between the elastomeric base member and the brass valve body. Salt solutions can cause corrosion of the brass valve body and de-bonding of the elastomeric base member from the valve body.

Iknayan Canadian Pat. No. 556,936 suggests another approach to protecting a valve body from corrosion. In the Iknayan valve a collar of a metal more anodic than the brass valve body is placed at the end of the valve body. Iknayan teaches that in the event that the bond between the rubber and the brass insert becomes exposed to the influence of any corroding material within the inner tube (such as water or a salt solution) the bond between the rubber and the brass insert is protected by the presence of the metal more anodic than the brass insert.

Boyer U.S. Pat. No. 2,778,374 discloses a third approach. In Boyer, a flanged ring is pressed onto the valve body from below in order to make a seal between the ring and the valve body and to capture the elastomeric base member in place. Boyer relies on the seal between the valve body and the flanged ring to eliminate leakage of air or liquid which might destroy the bond between the valve body and the base member.

It is an object of the present invention to provide an improved tire valve assembly which isolates the entire valve body from any liquid contained in the tire and which additionally provides improved protection to the interior of the valve core housing.

SUMMARY OF THE INVENTION

According to this invention, a tire valve assembly is provided which comprises a valve body which defines an outer passageway, a lower end, and an upper end. An elastomeric base member is secured to the lower end of the valve body so as to surround the lower end of the valve body and to extend into the outer passageway. This base member defines an annular outer sealing surface within the outer passageway. A valve core assembly sized to fit within the outer passageway defines a lower end, an upper end, and an inner passageway, and is adapted to receive valve means for releasably sealing the inner passageway. A corrosion resistant seal member is formed of a synthetic material and is positioned at the lower end of the valve core assembly so as to surround the lower end of the valve core assembly and to extend into the inner passageway. The valve core assembly is releasably secured in place in the outer passageway, and the seal member defines an annular inner sealing surface positioned to contact and seal against the outer sealing surface as the valve core assembly is installed in the valve body in order to protect both the valve body and the exterior of the valve core assembly from corrosion. The present invention is also directed to the valve body and to the valve core assembly, taken as separate units.

This invention provides the important advantage that the valve core assembly creates a water-tight seal with the elastomeric base member as the valve core assembly is installed in place. This water-tight seal isolates the bonding region between the elastomeric base member and the valve body from liquid and corrosion, and it additionally isolates the means for securing the valve core assembly in place in the outer passageway from liquid and corrosion. The seal member also extends into the inner passageway of the valve core assembly so as to protect the inner passageway from corrosion. In the preferred embodiment all of these advantages are provided without complicating assembly of the tire valve.

The invention itself, together with further objects and attendant advantages, will best be understood by reference to the following detailed description, taken in conjunction with the accompanying drawings.

BRIEF DESCRIPTION OF THE DRAWINGS

FIG. 1 is a perspective view of a tire valve assembly which incorporates a presently preferred embodiment of this invention.

FIG. 2 is a longitudinal sectional view taken along line 2—2 of FIG. 1.

FIG. 3 is an elevational view of the valve core assembly included in the embodiment of FIGS. 1 and 2.

DETAILED DESCRIPTION OF THE PRESENTLY PREFERRED EMBODIMENTS

Figure 4:
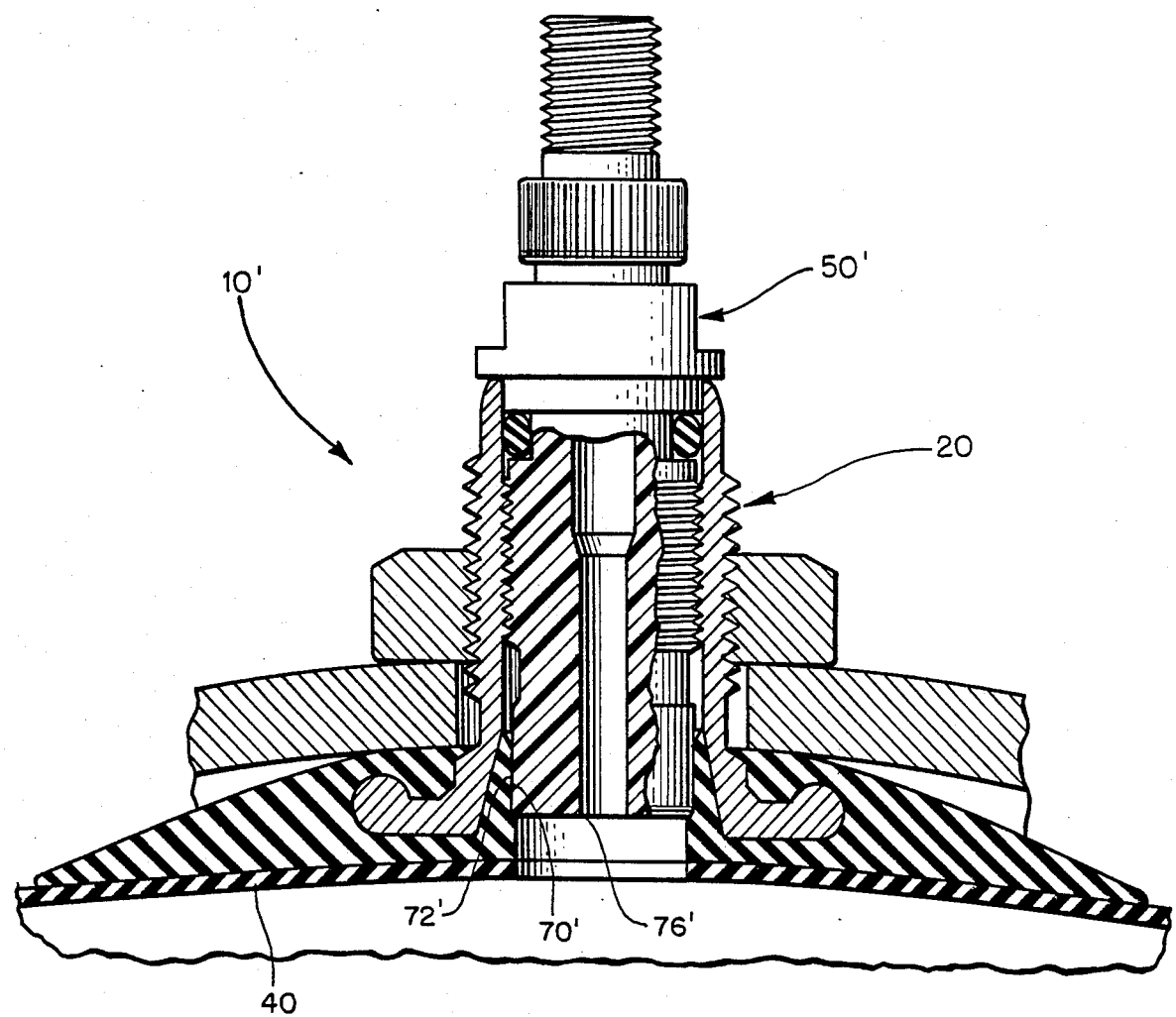
FIG. 4 is a longitudinal sectional view of an alternate embodiment which incorporates a modified valve core assembly.

Turning now to the drawings, FIG. 1 shows a perspective view of a tire valve assembly 10 which incorporates a presently preferred embodiment of this invention. This tire valve assembly 10 includes a valve body 20, a base member 40, and a valve core assembly 50.

As best shown in FIG. 2, the valve body 20 includes a generally cylindrical upper end 22 and a flanged lower end 24. The upper end 22 defines a set of outer threads 28 which are sized to receive a nut 30. As shown in FIG. 2, the nut 30 is used to clamp the valve body 20 in place on a tire rim R. The valve body 20 also defines an outer passageway 26 extending between the upper and lower ends 22, 24. This outer passageway 26 defines an upper seal surface 34 and a set of inner threads 32.

The base member 40 is formed of an elastomeric material and is bonded directly to the lower end 24 of the valve body 20. This base member 40 defines a generally planer lower surface 42 which in use is typically bonded to a tire tube T. As shown in FIG. 2, the base member 40 completely surrounds the lower end 24 of the valve body 20 and extends up into the outer passageway 26 to define an annular outer sealing surface 44. A lead-in taper 46 provides a gradual transition between the outer passageway 26 and the outer sealing surface 44.

The valve core assembly 50 shown in FIGS. 2 and 3 also defines a lower end 52 and an upper end 54. An inner passageway 56 extends through the core assembly 50 between the lower and upper ends 52, 54, and valve means 58 are mounted so as to seal the inner passageway 56 releasably. A wide variety of valve means can be used in this invention, including conventional valve cores as well as designs such as those shown in U.S. patent application Ser. No. 06/885,377 (Ezio Pagani), assigned to the assignee of the present invention.

In the conventional manner, the valve core assembly 50 includes a pair of flats 60, a generally cylindrical ridged surface 62 and a set of upper threads 64. The flats 60 and the ridged surface 62 are used in rotating the valve core assembly 50 to install the valve core assembly 50 in the valve body 20. The upper threads 64 are used to retain a conventional tire valve cap (not shown).

The valve core assembly 50 also defines a set of lower threads 68 as well as an O-ring 66 which is positioned to create a seal with the seal surface 34 of the valve body 20. The lower threads 68 are shaped to mate with the inner threads 32 of the valve body 20 in order to secure the valve core assembly releasably in place in the outer passageway 26.

An elastomeric seal member 70 is bonded to the lower end 52 of the valve core assembly 50. This seal member 70 defines an annular inner sealing surface 72 which is positioned to engage and create a water-tight seal with the outer sealing surface 44 of the base member 40. In addition, an inner portion 74 of the seal member 70 extends into the inner passageway 56 and defines an opening 76 which is preferably smaller with respect to the minimum diameter of the inner passageway 56.

The following details of construction are provided merely to define the best mode of this invention in greater detail, and are in no way intended to be limiting. In this embodiment the valve body 20 and the valve core assembly 50 are formed of brass, as is conventional in this art. Both have been screw machined to provide the mating threaded surfaces. The base member 40 is formed of butyl rubber which is vulcanized in place on the lower end of the valve body 20. The seal member 70 can be formed of a number of materials including EPDM and butyl rubber. EPDM is particularly advantageous in many applications because it molds well to brass. In this embodiment both the outer sealing surface 44 and the inner sealing surface 72 are cylindrical, and are shaped to provide an interference fit in order to provide a water-tight seal therebetween. In this embodiment the diameter of the outer sealing surface 44 is preferably between 0.430 and 0.434 inches, while the diameter of the inner sealing surface 72 is preferably between 0.445 and 0.450 inches. Preferably, the taper 46 is angled at 60° with respect to a plane transverse to the axis of the valve body. Conventional vulcanizing techniques are used to bond the base member 40 and the seal member 70 in place on the valve body 20 and the valve core assembly 50, respectively. In this embodiment the diameter of the opening 76 is 1/16 of an inch and the axial distance between the lowermost portion of the seal member 70 and the exposed portion of the inner passageway 56 is 0.625 inches.

It is not essential in all embodiments that the seal member 70 be formed as a separate elastomeric element which is bonded to the lower end of the valve core assembly 50. FIG. 4 shows an alternate embodiment 10' which includes a valve body 20 and a base member 40 which are identical to those described above. This embodiment 10' also includes a valve core assembly 50' which is identical to the valve core assembly 50 described above except that the valve core assembly 50' is formed of a nylon. In this embodiment the seal member 70' is an integral part of the lower end of the valve core assembly 50', and it is therefore the lower end of the valve core assembly 50' which itself forms the inner sealing surface 72' and the opening 76'. The nylon valve core assembly 50' itself forms a water-tight seal with the elastomeric base member 40.

In operation, the preferred embodiments described above provide important advantages. In particular, when the valve core assembly 50, 50' is screwed into place into the valve body 20 the inner sealing surface 72, 72' forms a water-tight seal with the outer sealing surface 44 of the base member 40. In this way, the bonding region between the base member 40 and the valve body 20 is completely isolated from contact with corrosive liquids such as salt solutions. In addition, the threads 68, 32 as well as the seal 66 and the seal surface 34 are also protected from corrosion.

The inner portion 74 of the seal member 70 also provides excellent protection to the valve core assembly 50 from corrosion. Because the opening 76 is relatively small, air trapped within the inner passageway 56 tens to remain in the inner passageway 56 and to prevent liquid from coming into contact with the exposed brass walls of the inner passageway 56 or with the valve means 58.

In use, the tire valve assembly 10 is installed on a rim R as shown in FIG. 2. Then the valve core assembly 50 is removed and liquid such as a salt solution is forced through the outer passageway 26 into the tube T. When the tube T has been filled sufficiently with water, the valve core assembly 50 is then threaded into place in the valve body 20, thereby creating a water-tight seal between the seal member 70 and the base member 40. Compressed air is then forced into the tube T past the valve means 58 to complete inflation of the tube T.

Though the combination of the valve body base member and valve core assembly has been described above in order to point out clearly the way these elements cooperate to provide corrosion resistance, it should be understood that the present invention is also directed to the valve body and to the valve core housing of this invention taken separately.

Of course, it should be understood that a wide range of changes and modifications can be made to the preferred embodiments described above. For example, in some applications the valve core assembly can be little more than a valve core having the seal member formed in the lower end of the core. Furthermore, it is not essential in al applications that the valve core assembly be held in place by threads on the inner wall of the valve body. An external nut arrangement can be substituted in some applications. In addition, the interfering cylindrical shape of the seal member 70 and the outer sealing surface 44 described above can be replaced with tapered sealing surfaces if desired. However, the cylindrical sealing surfaces described above provide the advantages of an unusually wide flow passage for the introduction of water into the tube.

It is therefore intended that the foregoing detailed description be regarded as illustrative rather than limiting, and that it be understood that it is the following claims, including all equivalents, which are intended to define the scope of this invention.

I claim:

1. A tire valve assembly comprising:
   a valve body which defines an outer passageway, a lower end, and an upper end;
   a corrosion resistant base member secured to the lower end of the valve body so as to surround the lower end of the valve body and to extend into the outer passageway, said base member defining an annular outer sealing surface within the outer passageway;
   a valve core assembly sized to fit within the outer passageway, said valve core assembly defining a lower end, an upper end, and an inner passageway, said valve core assembly adapted to receive valve means for releasably sealing the inner passageway;
   a corrosion resistant seal member formed of a synthetic material and positioned at the lower end of the valve core assembly so as to surround the lower end of the valve core assembly and to extend into the inner passageway; and
   means for releasably securing the valve core assembly in place in the outer passageway;
   said seal member defining an annular inner sealing surface positioned to contact and seal against the outer sealing surface as the valve core assembly is installed in the valve body in order to protect both the valve body and the exterior of the valve core assembly from corrosion;
   said annular inner sealing surface having a rest outer diameter which is larger than that of the outer sealing surface, and said outer sealing surface shaped to receive the seal member in an interference fit;
   said seal member defining an opening therethrough aligned with the inner passageway, and said opening having a diameter of about 1/16 inch such that the seal member facilitates the entrapment of air in the inner passageway between the valve means and the seal member.

2. The tire valve assembly of claim 1 wherein the securing means comprises a set of internal threads on the valve body around a portion of the outer passageway and a set of external threads on the valve core assembly sized to mate with the set of internal threads to secure the core housing assembly in place in the outer passageway.

3. The tire valve assembly of claim 1 wherein the valve body and the lower end of the valve core assembly are formed of brass.

4. The tire valve assembly of claim 1 wherein the outer sealing surface is substantially cylindrical.

5. The tire valve assembly of claim 1 wherein the seal member is formed of an elastomeric material.

6. The tire valve assembly of claim 5 wherein the lower end of the valve core assembly defines a tubular portion having an inside surface and an outside surface, and wherein the seal member is bonded to the tubular portion to cover and protect at least a portion of both the inside surface and the outside surface.

7. The invention of claim 1 wherein both the outer sealing surface and the inner sealing surface are substantially cylindrical.

8. The invention of claim 6 wherein both the outer sealing surface and the inner sealing surface are substantially cylindrical.

9. The invention of claim 8 wherein the outer and inner sealing surfaces define respective rest diameters, and wherein the diameter of the outer sealing surface is less than the diameter of the inner sealing surface by about 0.01–0.02 inches.

10. The invention of claim 1 wherein the portion of the inside surface covered and protected by the seal member has an axial length along the tubular portion of about ⅜ inch.

11. The invention of claim 1 wherein the portion of the inside surface covered and protected by the seal member has an axial length along the tubular portion of about ⅜ inch.

* * * * *